United States Patent Office 3,787,541
Patented Jan. 22, 1974

3,787,541
GRAPHITIZATION OF MESOPHASE PITCH FIBERS
Lloyd I. Grindstaff, Rte. 7, Box 733, Elizabethton, Tenn. 37643, and Mack P. Whittaker, 1 Woodland Circle, Johnson City, Tenn. 37601
No Drawing. Continuation-in-part of application Ser. No. 84,953, Oct. 28, 1970, which is a division of application Ser. No. 830,931, June 4, 1969, both now abandoned. This application Oct. 26, 1971, Ser. No. 192,639
Int. Cl. C01b 31/07
U.S. Cl. 264—29         4 Claims

ABSTRACT OF THE DISCLOSURE

Single phase graphite is obtained by extruding mesophase preparing by heating a carbonaceous material such as a hydrocarbon coker feed, coal tar pitch, ethylene tar pitch, etc. at a temperature above 400° C. until at least 75 percent quinoline-insoluble mesophase has been formed, extruding the resultant material at a temperature between the softening point of the mesophase and 700° C. and subsequently carbonizing the formed product by heating it in a non-oxidizing atmosphere to temperatures from about 1000° C. to about 3000° C. High density material can thus be obtained with controlled alignment of the graphitic structure.

CROSS-REFERENCE TO RELATED APPLICATIONS

This application is a continuation-in-part of pending application Ser. No. 84,953, filed Oct. 28, 1970, now abandoned, which application was a division of application Ser. No. 830,931, filed June 4,1969, now abandoned, and pendant therewith.

BACKGROUND OF THE INVENTION

The production of graphite with coke obtained from petroleum feedstocks by the conventional delayed coking technique has been mainly responsible for the wide acceptance of this material in modern technology. Graphite of this origin is thus used in the manufacture of electrodes for various metallurgical processes as well as in other situations where its remarkable high temperature properties and its electrical properties are desirable.

However, the manufacture and the properties of conventional graphite, be it the polycrystalline material of commerce or the pyrolytic variety, impose limitations on the material produced which render it unavailable in the practical sense for certain uses. In the case of pyrolytic graphite for instance, hardness and extreme anisotropy render it more susceptible to impact failure and contribute to the difficulties attendant to its processing and machining into usable shapes. In the case of graphite made from coke obtained by a delayed coking process, a number of factors tend to cause difficulties in some of its potential applications. Due to the nature of the coking process and the necessity for crushing the coke and employing a carbonizable binder in order to shape bodies which are subsequently converted to graphite, there are obtained conventionally non-uniform, irreproducible graphites with undesirably high porosity and low density which require impregnation and further subsequent graphitization of the impregnant to render them acceptable for most applications.

Sources of difficulty which compound these tendencies are heterogeneous raw materials, variables in crushing and sizing of the coke and in the mixing of the graphitizing formula, and the "slumping" of the formed bodies during the baking process. Bullough et al., in U.S. 3,256,003, describes and claims a method to avoid the slumping of heterogeneous molded pieces during bake. By the process described in the Bullough et al. patent, the molded piece is heat-treated to about 400° C. while under molding pressure to "set" the binder.

An object of this invention therefore is to provide single phase graphite bodies of great uniformity and reproducibility and with controlled density and isotropy. Another object is to provide graphite bodies of exclusively substantially uniform microporosity.

SUMMARY OF THE INVENTION

These and other objects will become apparent from the following description of the invention. The coke bodies of this invention are prepared by heating a liquefiable hydrocarbon as for example a petroleum-based coker feedstock, a coal tar pitch, an ethylene tar pitch, or similar graphitizable material to a temperature of at least 400° C. for a period of time sufficient to form a fusible substance having substantially a zero porosity, containing at least 75 percent by weight of mesophase and having a volatile content of more than 22 percent by weight, extruding and setting this mesophase into a desired shape at a temperature within the range of about 400° to 700° C.; and converting the resulting body to carbon by heating it in a non-oxidizing atmosphere from about 1000° C. to conventional graphitizing temperatures up to 3000° C. Since the mesophase material is fusible prior to setting, alignment or lack of alignment in the carbon body of this invention can be created by controlling the orientation of this pre-coke carbonaceous substance and will be substantially preserved through further treatment. Mechanical pressure of varying degree and direction may be applied to the body at the mesophase stage to affect the density of the product and the extent of its internal structure and alignment. The mesophase, which constitutes the higher molecular weight pitch insoluble portion of the fusible substance, may, if desired, be isolated prior to mechanical forming by lixiviation of the lower molecular weight isotropic pitch which may be contained in the heat-treated coker feedstock or other starting material.

The mesophase content of the heated pitch can be determined by dissolution of the soluble, unconverted pitch in quinoline, creosote oil, or the like, as for example by the method of ASTM standard test D 2318 for quinoline insolubles. Coal-tar pitch and certain ethylene-tar pitch precursors contain carbon, ash, and the like insolubles. These must be taken into account in determining the percent of mesophase in the final heat treated pitch.

Ultimately, there is thus obtained by the process just described, a single-phase unfilled graphite which can possess high density and high strength and which in any event has a high degree of uniformity and reproducibility.

Mesophase has been described and characterized by Brooks and Taylor, "Chemistry and Physics of Carbon," vol. 4, p. 243 et seq., P. L. Walker, Ed Marcel Dekker, Inc., New York. Mesophase is a highly anisotropic initially essentially spherical material consisting of relatively large molecules arranged parallel to each other with their long axes normal to the boundaries of the spheres. These spherical units become visible through polarized light microscopy when they reach a size of about 0.1 to 0.5 micron in diameter. Under the influence of heat, these units continue to grow and develop at the expense of the isotropic pitch surrounding them forming a fusible plastic mass which is insoluble in substantially all organic solvents. When the mesophase content of the heat treated carbonaceous substance reaches a level of about 75 percent of the total mass and a volatile material content of more than 22 percent by weight, the carbon substance can be subjected to the hereinbelow described forming techniques to prepare the carbon pieces. When considering the extent of heat treatment necessary to form a usable amount of mesophase, it should be kept in mind that any mesophase formed can be concentrated by isolation thereof from a mesophase-pitch mixture since the former is not soluble in liquids such as quinoline, pyridine and the like, while the yet unconverted isotropic pitch is.

From the point of view of this invention, the interesting feature of mesophase is that it is soft at temperatures of about 350 to 700° C. and that in that state, it can be mechanically formed or deformed. Thus, large irregularly shaped areas of mesophase can be elongated or flattened by mechanical operations such as extrusion or molding at temperatures at or above the softening point.

Extrusion techniques well known in the art may be employed to form bars, rods, and filaments of graphitizable material. Various types of molding can be employed to shape the mesophase or, with the use of appropriately directed pressure, to align the mesophase into an anisotropic structure or, by pressing isostatically in a fluid, to produce a material free from anisotropy. Pressure when used also serves to increase the density of the mesophase and ultimately of the graphite resulting from it. Naturally, any practical achievable pressure may be brought to bear on the mesophase to affect alignment and density in the manner and to the extent desired. Thus it has been found that uniform single phase graphite can be manufactured by carbonization and graphitization to about 2700° C. of mesophase molded at pressures of 10 to $20 \times 10^3$ p.s.i. and that this product will have apparent densities, in the graphite stage, of 1.85 g./cc. or more, compressive strengths of 10,000 p.s.i. and coefficients of thermal expansion of about 15 to $80 \times 10^{-7}$ inches per inch per degree centigrade in the molding direction and of about 5 to $80 \times 10^{-7}$ in the transverse direction.

The very high coke yield of pressed mesophase also renders it useful as a binder for aggregates. In such event, the cooled presesd mesophase is crushed and mixed with the selected aggregate which may or may not be carbonaceous, and the mixture is heat treated to graphitization temperature.

As to the graphitized products of this invention, with or without the variations that can be carried out by those skilled in the art without departing from its essence, they offer a number of useful advantages over the graphite of the art due to the uniformity and reproducibility of structure and properties, controlled structural alignment, lower microporosity, greater with-grain thermal conductivity as well as flexural and tensile strength, striking decrease in permeability, greater resistance to oxidation and erosion, and capacity to take a fine surface finish to close tolerances.

DESCRIPTION OF PREFERRED EMBODIMENTS

A better understanding of the invention may be obtained from the examples that follow, which are provided to illustrate but not to limit the invention beyond the scope of the appended claims.

The volatile matter being discussed herein is determined by ASTM method D 271–48 modified for "sparking fuels" and is exclusive of the moisture and free oil which would be removed by heating to temperatures of 400–500° F. Volatile matter is determined in a platinum crucible in an electrically heated furnace maintained at temperatures of 1742° F.±36° F. A one gram sample of dry —60 mesh coke is preheated at temperatures below 17421 F. and then kept at a temperature of 1742° F.±36° F. for 6 minutes and the resulting weight-loss is termed volatile matter.

Example 1

A high boiling petroleum hydrocarbon cokable feedstock, obtained as a residue of vacuum distillation of virgin petroleum residue, is heated for six hours at 425° C. at atmospheric pressure. The resulting material containing 28 percent volatile matter by weight and consisting of over 75 percent mesophase, is spun through a spinneret having an orifice of 1.5 mm. in length and 0..3 mm. in diameter. The spun filament is carbonized at a temperature of 600° C. for 6.5 hours. The carbonized mesophase filament is then graphitized conventionally by heating it in nitrogen at a rate of about 12° C. per minute to a temperature of 2900° C. and holding it at that temperature for a period of 30 minutes.

Example 2

A quantity of commercial 100 percent thermal tar (a high boiling aromatic residue obtained from thermal cracking of a petroleum gas oil fractions) is heated at 425° C. for 16 hours to yield a mesophase material having a volatile content of 23 percent by weight, and a mesophase content of greater than 75 percent. This mesophase is extruded through a 2.5 inch die at a pressure of 10,000 p.s.i. at 400° C.; then heated to 800° C. over 5 days.

After graphitization in the manner of Example 2, there is obtained a body of single phase graphite having a density of 1.73 g./cc. and a compressive strength of 5000 p.s.i. in the direction of molding.

Example 3

A sample of coal tar pitch, Allied Chemical Company's CP–275, grade 350, softening point 187° C., is converted to essentially 80 percent mesophase by heating in a 4 liter resin flask at 435° C. for 16 hours. The residue, having a volatile matter content of 25 percent, is ground to approximately 50 percent —200 mesh. This material, 250 grams, is extruded through a 2 inch die utilizing 10,000 p.s.i. at 410° C.

The sample is baked to 1000° C. using a 7 day heating cycle. The sample is then graphitized to 2500° C. in a resistance tube graphitizer. The apparent density of the graphitized material is 1.90 g./cm.

We claim:
1. A process for making graphite bodies which consists in.
   (a) heat treating a graphitizable and liquefiable hydrocarbon coker feed at a temperature of at least about 400° C. for a time sufficient to yield a fusible mesophase-pitch mixture consisting of at least 75 percent quinoline-insoluble mesophase by weight and having a volatile material content of more than 22 percent by weight;
   (b) extruding the fusible mixture into a desired shape at a temperature within the range of about 400° C. to about 700° C., and
   (c) converting the resulting body to carbon by heating in a non-oxidizing atomsphere from about 1000° C. to conventional graphitizing temperatures up to 3000° C.

2. The process of claim 1 wherein the fusible mesophase-pitch mixture is pulverized prior to extruding.

3. The process of claim 1 wherein the liquefiable coker feed is coal-tar-pitch.

4. The process of claim 1 wherein the extruding step forms a filamentous material.

References Cited

UNITED STATES PATENTS

| | | | |
|---|---|---|---|
| 3,392,216 | 7/1968 | Otani | 264—DIG 19 |
| 3,629,379 | 12/1971 | Otani | 264—DIG 19 |
| 3,552,922 | 1/1971 | Ishikawa et al. | 264—DIG 19 |
| 3,595,946 | 7/1971 | Joo et al. | 264—DIG 19 |

OTHER REFERENCES

J. L. White et al.: "Mesophase Microstructures In Carbonized Coal-Tar Pitch," Carbon, 1967, vol. 5, Pergamon Press, pp. 517–518.

JOHN H. MILLER, Primary Examiner

U.S. Cl. X.R.

264—DIG. 19; 423—447, 448